(12) United States Patent
Hrabak

(10) Patent No.: US 10,159,044 B2
(45) Date of Patent: Dec. 18, 2018

(54) METHOD AND APPARATUS FOR CONTROLLING OPERATING STATES OF BLUETOOTH INTERFACES OF A BLUETOOTH MODULE

(71) Applicant: GM GLOBAL TECHNOLOGY OPERATIONS LLC, Detroit, MI (US)

(72) Inventor: Robert A. Hrabak, West Bloomfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 442 days.

(21) Appl. No.: 14/100,051

(22) Filed: Dec. 9, 2013

(65) Prior Publication Data
US 2015/0163748 A1   Jun. 11, 2015

(51) Int. Cl.
*H04W 52/02* (2009.01)

(52) U.S. Cl.
CPC ....... *H04W 52/0245* (2013.01); *Y02D 70/142* (2018.01); *Y02D 70/144* (2018.01); *Y02D 70/26* (2018.01)

(58) Field of Classification Search
CPC .... Y02D 70/00; Y02D 70/144; Y02D 70/142; Y02D 70/1242; Y02D 70/146; H04W 4/80; H04W 84/18; H04W 4/008; H04W 8/005; H04W 12/06; H04W 4/02; H04W 76/14; H04M 1/6075; H04M 2250/02; H04M 1/6091; H04M 1/7253
USPC ................................ 455/41.1, 41.2
See application file for complete search history.

(56) References Cited

U.S. PATENT DOCUMENTS

| | | | | |
|---|---|---|---|---|
| 8,954,007 B2* | 2/2015 | Hillyard | ................ | H04W 8/005 455/41.1 |
| 2011/0028093 A1* | 2/2011 | Patel | ...................... | H04B 17/27 455/41.2 |
| 2011/0046799 A1* | 2/2011 | Imes | .................... | F24F 11/0086 700/286 |
| 2011/0117856 A1* | 5/2011 | Veluppillai | ........... | H04W 36/32 455/67.11 |
| 2014/0351560 A1* | 11/2014 | Lautner | ................... | G06F 15/80 712/30 |

(Continued)

FOREIGN PATENT DOCUMENTS

| | | |
|---|---|---|
| CN | 102891657 A | 1/2013 |
| CN | 103018715 A | 4/2013 |

(Continued)

OTHER PUBLICATIONS

State Intellectual Property Office of the People's Republic of China, Office Action in Chinese Patent Application No. 201410744371.0 dated Jan. 23, 2017.

(Continued)

*Primary Examiner* — Golam Sorowar
(74) *Attorney, Agent, or Firm* — Lorenz & Kopf, LLP

(57) ABSTRACT

A first Bluetooth-enabled device includes an interface controller that determines proximity between a first Bluetooth module and a second Bluetooth module of a second Bluetooth-enabled device, and controls transitions, based on the proximity between the first Bluetooth module and the second Bluetooth module, between a first set of operating states of a classical Bluetooth interface of the first Bluetooth module that include an enabled state and a disabled state.

20 Claims, 3 Drawing Sheets

(56) References Cited

U.S. PATENT DOCUMENTS

2014/0357192 A1* 12/2014 Azogui ................... H04B 7/26
                                                                             455/41.2

FOREIGN PATENT DOCUMENTS

| CN | 103187996 A | 7/2013 |
| CN | 203180910 U | 9/2013 |

OTHER PUBLICATIONS

Chinese Patent and Trade Mark Office, Office Action for Chinese Patent Application No. 201410744371.0, dated Jul. 18, 2016.

* cited by examiner

METHOD AND APPARATUS FOR CONTROLLING OPERATING STATES OF BLUETOOTH INTERFACES OF A BLUETOOTH MODULE

TECHNICAL FIELD

The technical field generally relates to wireless communications, and more particularly relates to controlling operating states of Bluetooth interfaces of a Bluetooth module.

BACKGROUND

Many modern consumer electronics devices include Bluetooth communication capability. Such devices include a Bluetooth module that includes one or more Bluetooth interfaces that comply with various Bluetooth communication standards.

Many of these devices are powered by a stored energy source, such as a battery. It is desirable to reduce consumption of the stored energy so that the stored energy source will last longer without needing to be replenished (e.g., charged). One example would be when a first Bluetooth module is in a consumer electronics device, such as smartphone, and a second Bluetooth module is integrated within a vehicle. It would be desirable to provide an automatic control that can control the operating state of the first Bluetooth module so that its stored energy source can be conserved. For instance, when a user carrying a smartphone departs their vehicle it would be desirable to provide an automatic control mechanism that automatically disables (or switches off) one or more of the Bluetooth interfaces of the Bluetooth module. Conversely, it would also be desirable to provide an automatic control mechanism that automatically enables (or switches on) one or more of the Bluetooth interfaces of the first Bluetooth module when the user approaches their vehicle so that a connection can be established with the second Bluetooth module of the vehicle.

Accordingly, it is desirable to provide automated methods and apparatus for controlling operating states of Bluetooth interfaces of a Bluetooth module. Furthermore, other desirable features and characteristics of the present invention will become apparent from the subsequent detailed description and the appended claims, taken in conjunction with the accompanying drawings and the foregoing technical field and background.

SUMMARY

In one embodiment, a first Bluetooth-enabled device is provided. The first Bluetooth-enabled device includes an interface controller. The interface controller determines proximity between a first Bluetooth module and a second Bluetooth module of a second Bluetooth-enabled device, and then controls transitions between a first set of operating states of a classical Bluetooth interface of the first Bluetooth module based on the proximity between the first Bluetooth module and the second Bluetooth module. The first set of operating states includes an enabled state and a disabled state. In some embodiments, the first Bluetooth module also includes a Bluetooth Low Energy (BLE) interface designed to operate in a second set of operating states comprising an idle state or an active state. In these embodiments, the interface controller is in operable communication with the BLE interface and is further designed to control the second set of operating states of the BLE interface based on proximity between the first Bluetooth module and the second Bluetooth module of the second Bluetooth-enabled device.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
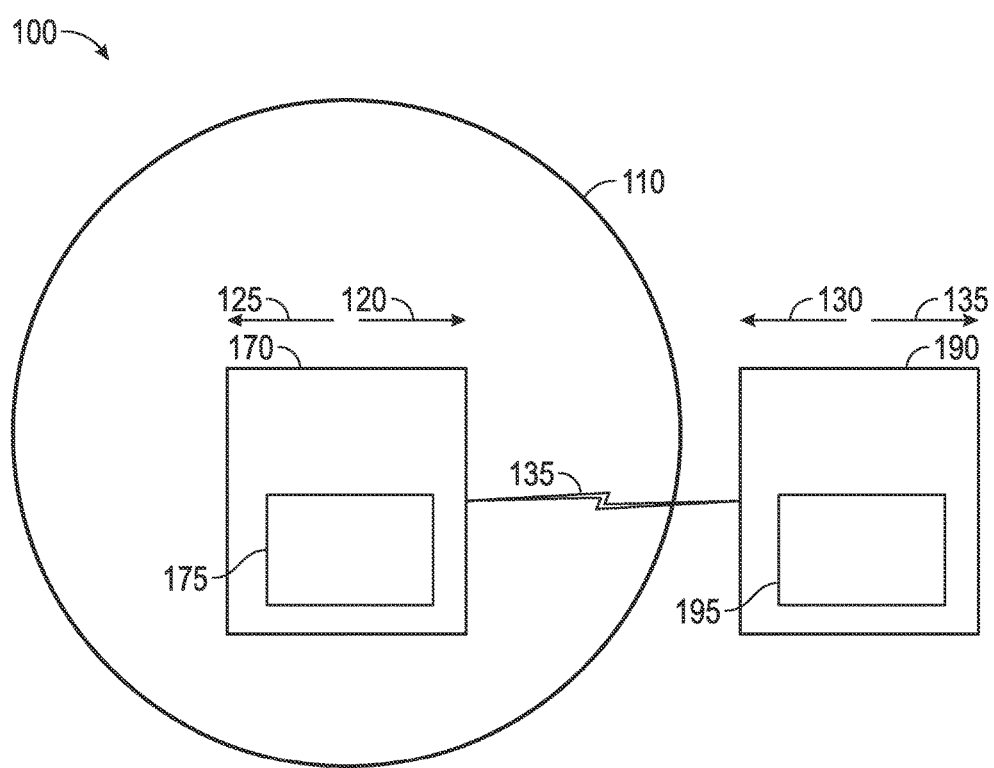
FIG. 1 is a block diagram of a first Bluetooth-enabled device and a second Bluetooth-enabled device.

FIG. 1 is a block diagram of a first Bluetooth-enabled device 170 and a second Bluetooth-enabled device 190. Preliminarily, it is noted that the terms "Bluetooth-enabled device," "end device," "consumer electronics device," "wireless communication device," can be used interchangeably herein. As used herein, a "Bluetooth-enabled device" includes a Bluetooth module and Bluetooth antenna, and is capable of implementing all known Bluetooth standards and protocols including a Bluetooth Low Energy (BLE) protocol. Bluetooth technical specifications are developed and published by the Bluetooth Special Interest Group (SIG). Bluetooth Core Specification Version 4.0, adopted Jun. 30, 2010, Core Specification Supplement (CSS) v1 adopted Dec. 27, 2011, Core Specification Addendum (CSA) 2 adopted Dec. 27, 2011, Core Specification Supplement (CSS) v2 adopted Jul. 24, 2012, and Core Specification Addendum (CSA) 3 adopted Jul. 24, 2012, describe various features of the BLE standards, and are incorporated by reference herein in their entirety. Copies of any of the incorporated Core Specifications, including the Bluetooth Specification Version 4.0, can be obtained from the Bluetooth Special Interest Group (SIG) by contacting them in writing at Bluetooth Special Interest Group, 5209 Lake Washington Blvd NE, Suite 350, Kirkland, Wash. 98033, USA, or by visiting their website and downloading a copy. The Bluetooth Core Specifications incorporate all prior versions of the Bluetooth specifications by reference. Bluetooth Core Specification Version 4.0 includes Classical Bluetooth specifications and protocols, Basic Rate (BR)/Enhanced Data Rate (EDR) specifications and protocols, Bluetooth High Speed (HS) specifications and protocols and Bluetooth Low Energy (BLE) specifications and protocols. Within the Bluetooth Core Specification Version 4.0, Volume 1, Volume 2, Volume 3 parts A-F, and Volume 4 define Classical Bluetooth specifications and protocols including the Classical Bluetooth interface referenced below, Volume 5 of the Bluetooth Core specification 4.0 describes Bluetooth High-Speed specifications and protocols, and Volume 6 of the Bluetooth Core specification 4.0 describes Bluetooth Low Energy (BLE) specifications and protocols.

Without limitation, the devices 170, 190 may be any Bluetooth-enabled communications device such as a smart phone or other cellular phone, desktop, laptop or palmtop computer, tablet computer, a PDA, a Bluetooth headset, headphones, or speaker, a Bluetooth enabled remote controller, a controllable Bluetooth toy or machine, token, a key fob, a watch, a gaming pad, a fitness device, Bluetooth enabled glasses, or any other personal attire, a vehicle sensor, a vehicle infotainment system, or other automotive part, an entertainment device, a computer mouse, keyboards, webcams, or any other computer accessories, input devices, or output devices, or any other Bluetooth enabled device. Further, it is noted that the end device 170 can actually be multiple different devices in some implementations (e.g., a key fob and a Bluetooth enabled communication device such as a smart phone).

In FIG. 1, the first Bluetooth-enabled device 170 includes a first Bluetooth module 175, and the second Bluetooth-enabled device 190 includes a second Bluetooth module 195. The terms "classical Bluetooth interface," "classical Bluetooth chipset," "classical Bluetooth module" can be used interchangeably herein. The terms "BLE interface," "BLE chipset," "BLE module" can be used interchangeably herein. In general, a Bluetooth module includes a Bluetooth controller and a host (not illustrated in FIG. 1) as defined in the any of the Bluetooth communication standards that are incorporated by reference herein.

Each Bluetooth module 175/195 generates signals to be transmitted via the Bluetooth antenna, and also receives signals transmitted from other Bluetooth-enabled devices via the Bluetooth antenna. Each Bluetooth module includes both a classical Bluetooth interface and a BLE interface. In addition, each Bluetooth module 175/195 includes a signal processing module that can be used in conjunction with a proximity detection/determination module that processes information from signals received by the Bluetooth antenna to determine signal strength information, and in some implementations, to determine the approximate distance between the source of those signals that particular Bluetooth module. In one embodiment, the signal processing module can determine/measure signal strength information (e.g., a received signal strength indicator (RSSI)) associated with signals communicated from another Bluetooth module. In one implementation, the signal processing module can generate a reporting message that includes the signal strength information, and provide it to a proximity determination module that can compare the signal strength information to one or more thresholds to determine the proximity to the other Bluetooth module. RSSI is just one exemplary metric that can be used to determine proximity. Alternatively, any other link quality indicators, such as a Bluetooth proximity profile, can be used to determine the distance between two Bluetooth-enabled devices. The proximity profile is defined in the BLE standard. The proximity profile uses a number of metrics including signal strength information, state of the battery charge, whether a device is connected, etc. to characterize the proximity of one BLE enabled device (e.g., device 170) to another BLE enabled device (e.g., device 190). Further details regarding the first Bluetooth module 175 and the second Bluetooth module 195 will be described below with reference to FIGS. 2 and 3.

The first Bluetooth module 175 and the second Bluetooth module 195 each have a particular communication range in which they can receive communication signals from at least one interface of the respective Bluetooth modules. In this simplified example of FIG. 1, the Bluetooth communication range of the first Bluetooth module 175 is illustrated via circle 110. In this regard it is noted that each interface of the first Bluetooth module 175 can have a different communication range, but in general the classical Bluetooth communication range and the BLE communication range are similar (albeit slightly different).

Both the first Bluetooth-enabled device 170 and the second Bluetooth-enabled device 190 are portable or mobile meaning that they can be stationary or moving at any particular time. For example, the first Bluetooth-enabled device 170 and the second Bluetooth-enabled device 190 can both be stationary or moving in any direction at any given instant. The first Bluetooth-enabled device 170 can move in a direction 120 toward the second Bluetooth-enabled device 190 or in another direction 125 away from the second Bluetooth-enabled device 190, or the second Bluetooth-enabled device 190 can move in a direction 130 toward the first Bluetooth-enabled device 170 or in another direction 135 away from the first Bluetooth-enabled device 170. For instance, in some situations, the first Bluetooth-enabled device 170 can move in the direction 120 toward the second Bluetooth-enabled device 190, while the second Bluetooth-enabled device 190 remains stationary.

Because the first Bluetooth-enabled device 170 and the second Bluetooth-enabled device 190 are both mobile they can move into and out of classical Bluetooth communication range with each other, and can also move into and out of BLE communication range with each other. It would be desirable to provide a controller for controlling the state of the classical Bluetooth interface and the state of the BLE interface that are present in the first Bluetooth module 175 and the second Bluetooth module 195

Some features of one implementation of the Bluetooth chipsets will now be described below with reference to FIG. 2.

Figure 2:
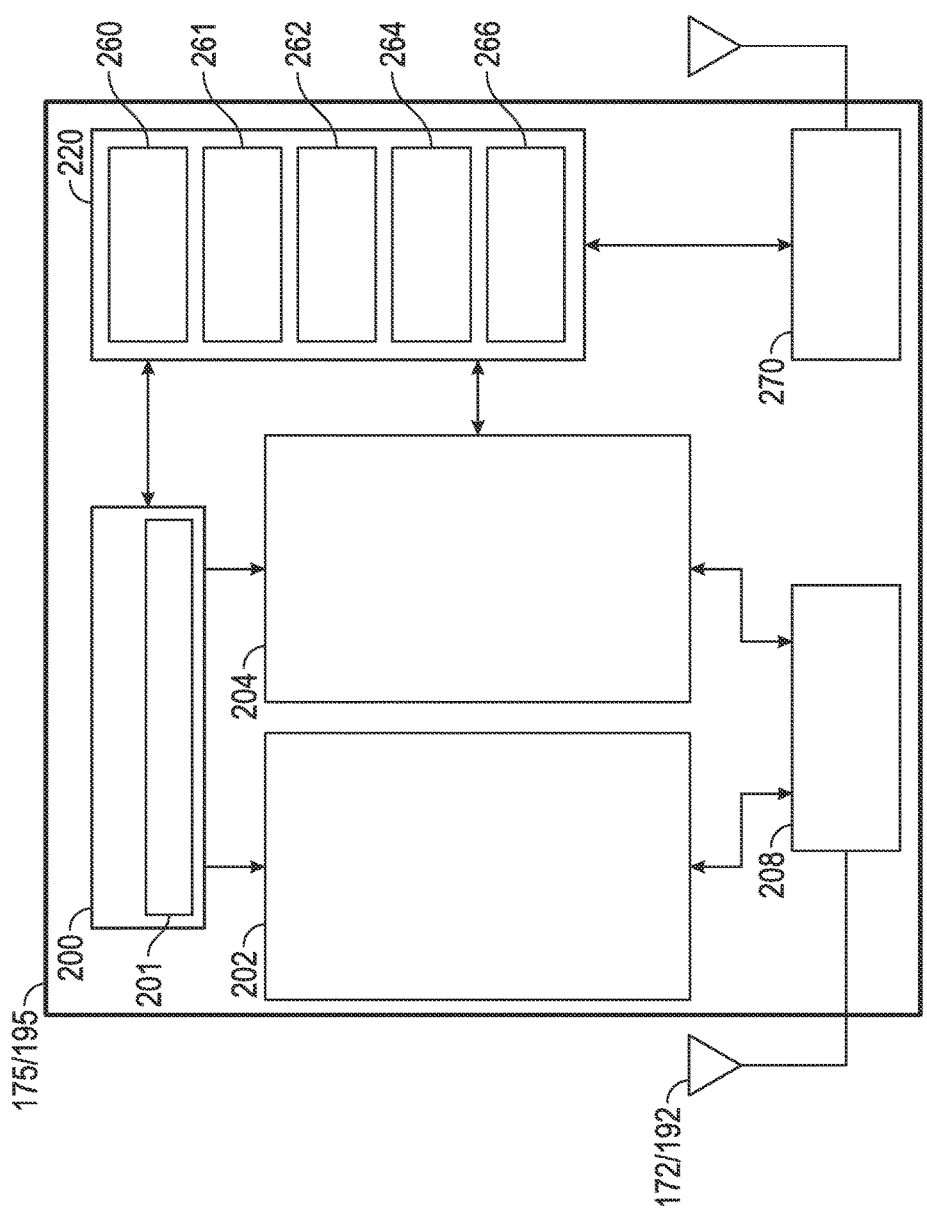
FIG. 2 is a simplified block diagram that illustrates an example of a Bluetooth chipset and a Bluetooth antenna that can be implemented at a Bluetooth-enabled device in accordance with some of the disclosed embodiments.

FIG. 2 is a block diagram that illustrates an example of a Bluetooth chipset 175/195 and a Bluetooth antenna 172/192 that can be implemented at the first Bluetooth-enabled device 170 and/or a second Bluetooth-enabled device 190 in accordance with some of non-limiting examples of the disclosed embodiments.

The Bluetooth chipsets 175/195 include application programs 200 that comprise non-transitory processor-executable instructions, a Bluetooth Low Energy (BLE) interface 202 that implements a BLE protocol stack, a classical Bluetooth interface 204 that implements a Bluetooth Basic Rate (BR)/Enhanced Data Rate (EDR) protocol stack, a Bluetooth radio transceiver 208, a processor 220 that includes, for example, a central processing unit (CPU), such as a dual core central processing unit (CPU) 260 and 261 (or any other multicore CPU having any number of processor cores), a random access memory (RAM) 262, a read only memory (ROM) 264, and interface circuits 266 to interface with Bluetooth radio transceiver 208. The RAM 262 and ROM 264 may be implemented using any known type of semiconductor memory The Bluetooth chipset 175/195 includes at least a Bluetooth Low Energy (BLE) interface and a classical Bluetooth interface. The Bluetooth BR/EDR protocol stack is described in the Bluetooth Specification version 3.0+HS, which is incorporated by reference herein in its entirety. The BLE protocol stack is described in the Bluetooth Core Specification, Version 4.0 protocol specification, which is incorporated by reference herein in its entirety. As is known in the art, the BLE protocol stack 202 includes two main parts that are commonly referred to as the controller and the host. The controller comprises a physical layer and a link layer (LL), and are typically implemented as a small System-on-Chip (SOC) with an integrated radio, such as Bluetooth radio 208. The host runs on an application processor and includes upper layer functionality including the Logical Link Control and Adaptation Protocol (L2CAP), the Attribute Protocol (ATT), the Generic Attribute Profile (GATT), the Security Manager Protocol (SMP) and the Generic Access Profile (GAP). Further technical details regarding each layer of the BLE protocol stack are described in the Bluetooth Specification Version 4.0 (as well as its supplements and Addenddums). The BLE protocol stack is optimized for occasional connections that allow for longer sleep times between connections, small data transfers, very low duty cycles and simpler topology than Classic Bluetooth devices. Some characteristics of BLE technology that underlie help achieve ultra-low power (ULP) performance are maximized standby time, fast connection, and low peak transmit/receive power. Classic Bluetooth employs a "connection oriented" radio with a fixed connection interval. In contrast, BLE technology employs a variable connection interval that can be set from a few milliseconds to several seconds depending on the application. In addition, because it features a very rapid connection, BLE technology can normally be in a connectionless state where the two ends of a link are aware of each other, but link up only when absolutely necessary and then for as short a time as possible. This connectionless operational mode of BLE technology ideally suits transmission of data where fully asynchronous communication can be used to communicate send low volumes of data infrequently.

In accordance with some of the disclosed embodiments, any of the Bluetooth chipsets 175/195 described herein can be a Dual-Mode Bluetooth chipsets. As is known in the art, Dual-Mode Bluetooth chipsets are capable of communicating with Classic Bluetooth technology and other dual-mode chipsets using a conventional Bluetooth architecture. Dual-Mode Bluetooth chipsets are capable of communicating with all the legacy Classic Bluetooth devices as well as BLE devices. In an alternative embodiment, the BLE interface 202 and the classical Bluetooth interface 204 can be implemented using separate chipsets including a single mode Bluetooth chipset that is a BLE-only chipset that is optimized for ultra-low power operation, and that can communicate with other single mode Bluetooth chipsets and dual-mode Bluetooth chipsets when the latter are using the BLE technology part of their architecture to transmit and receive.

The Bluetooth protocol stacks of interfaces 202 and 204 and the application programs 200 (including the interface controller 201) may be embodied as program logic stored in the RAM 262 and/or ROM 264 in the form of sequences of programmed instructions which, when executed in the CPUs 260 and/or 261, carry out at least some of the functions of the disclosed embodiments. The program logic may be delivered to the RAM 262 or ROM 264 from a computer program product in the form of a non-transitory computer-usable media such as resident memory devices, smart cards or other removable memory devices. Alternately, they may be embodied as integrated circuit logic in the form of programmed logic arrays or custom designed application specific integrated circuits (ASICs). In some implementations, the program logic may be downloaded from such computer readable media to be stored, for example, in the RAM 262 or programmable ROM 264 for execution by the CPUs 260 and/or 261.

The Bluetooth radio 208 may include separate transceiver circuits, or alternatively, the radio 208 may be a single radio module capable of handling one or multiple channels in a high speed, time and frequency multiplexed manner.

The other radio 270 may be any of a variety of wireless personal area network (WPAN), wireless local area network (WLAN), or wireless wide area network (WWAN) radio devices that are known in the art.

As mentioned above, the application programs 200 can include, among other things, an interface controller 201. As will be described below, the interface controller 201 is used to control the states of the BLE interface 202 and the classical Bluetooth interface 204 depending on proximity of the first Bluetooth module 175 to the second Bluetooth module 195 (or vice-versa).

Different States of the Classical Bluetooth Interface and the BLE Interface

To explain further, at any particular time, the BLE interface 202 can be in either an idle state or an active state. By contrast, at any particular time, the classical Bluetooth interface 204 can be in either a disabled state (e.g., off) or an enabled state (e.g., on).

When the BLE interface 202 is in the idle state, the BLE interface 202 scans for incoming BLE beacons or advertisement messages from another Bluetooth-enabled device. By contrast, when the BLE interface 202 is in the active state, the BLE interface 202 is communicating with (or connected to) another Bluetooth-enabled device and measures proximity to that Bluetooth-enabled device. Further, when the BLE interface 202 is in the idle state, the classical Bluetooth interface 204 is in its disabled state, and when the BLE interface 202 is in the active state, the classical Bluetooth interface 204 can be in either its disabled state or its enabled state depending on proximity of the first Bluetooth module 175 to the second Bluetooth module 195.

When the classical Bluetooth interface 204 is in its enabled state, the BLE interface 202 is in its active state. By contrast, when the classical Bluetooth interface 204 is in its disabled state, the BLE interface 202 can be in either its idle state or in its active state.

As will now be described below, in accordance with the disclosed embodiments, methods and apparatus are provided for controlling the state of the BLE interface 202 and the state of the classical Bluetooth interface 204 based on the proximity between the first Bluetooth module 175 of the first Bluetooth-enabled device 170 and the second Bluetooth module 195 of the second Bluetooth-enabled device 190.

In the example embodiment that will be described below with reference to FIG. 3, it will be presumed that the first Bluetooth-enabled device 170 of FIG. 1 is moving in a direction 120 towards second Bluetooth-enabled device 190 of FIG. 1 and that the second Bluetooth-enabled device 190 is stationary. To differentiate between the first Bluetooth-enabled device 170 and the second Bluetooth-enabled device 190, the first Bluetooth-enabled device 170 will be referred to as the "controller Bluetooth-enabled device," while the second Bluetooth-enabled device 190 will be referred to below as the "target Bluetooth-enabled device." However, there is no limitation on which of the first Bluetooth-enabled device 170 and the second Bluetooth-enabled device 190 is moving or stationary at any given time, and the designations as "target" and "controller" could be swapped depending on relative state of the device and which device is scanning to search for a BLE beacon.

Figure 3:
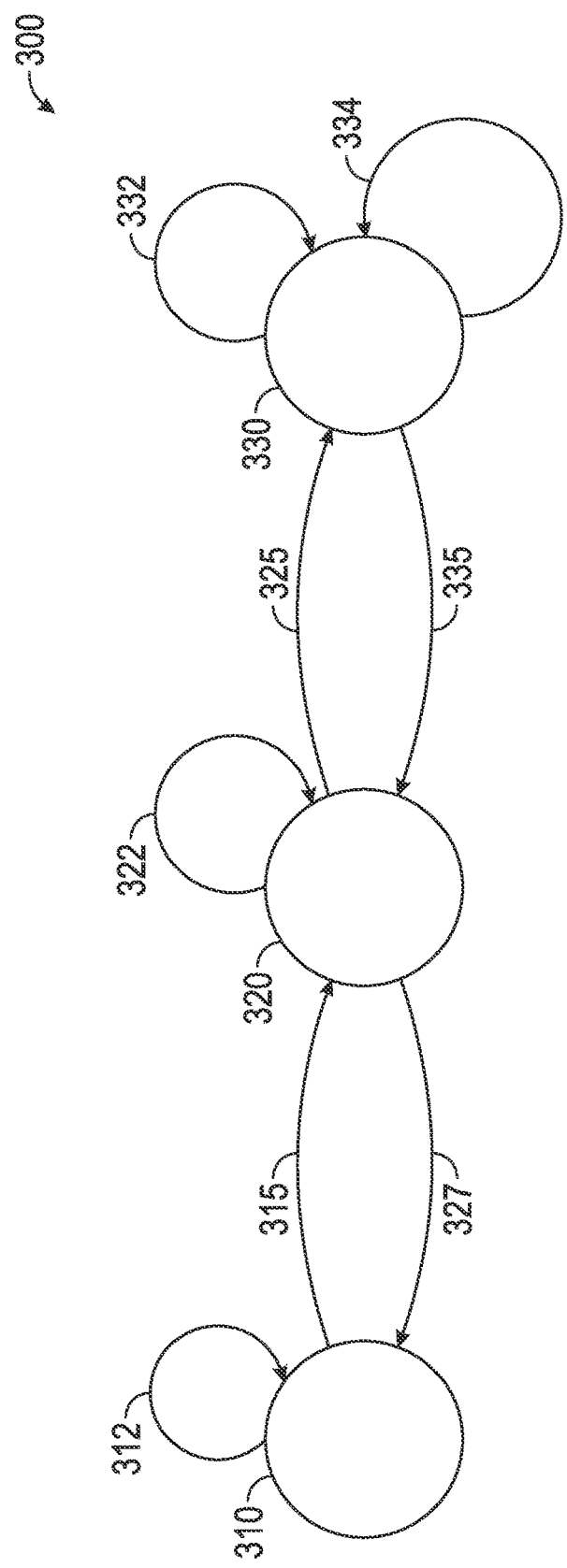
FIG. 3 is a state diagram that represents different states of an interface controller of a Bluetooth-enabled device in accordance with one of the disclosed embodiments.

FIG. 3 is a state diagram 300 that represents different states of an interface controller 201 of a controller Bluetooth-enabled device 170 in accordance with one of the disclosed embodiments. In the state diagram 300, the circles 310, 320, 330 represent the different states of the interface controller 201 and arrows 315, 325, 327, 335 between the circles 310, 320, 330 represent transitions between the different states. The different states are a far-field state 310, a range detection state 320 and an active state 330. The transitions (represented by the arrows) take place when different trigger events (or trigger actions) occur. In the description that follows, the order in which the different states are described as non-limiting and at any particular instant the interface controller 201 of the controller Bluetooth-enabled device 170 can be any one of the given states 310, 320, 330.

In the far-field state 310, the controller Bluetooth module 175 is outside BLE communication range of any other Bluetooth-enabled device. In the far-field state 310, the interface controller 201 is scanning to search for a BLE beacon being transmitted from another Bluetooth-enabled device, such as the target Bluetooth-enabled device 190, and no proximity determination is taking place at the interface controller 201. As indicated by loop 312, the interface controller 201 scans to search for a BLE beacon being transmitted by the target Bluetooth-enabled device 190. The scanning process at 312 continues until a BLE beacon is detected. In addition, the BLE interface 202 of the controller Bluetooth module 175 is idle (meaning that it is on and in a scanning or advertising state, but is not communicating), whereas the classical Bluetooth interface 204 is disabled (or in a power minimized state).

When the interface controller 201 detects a BLE beacon during scanning at 312 (e.g., when the interface controller 201 comes within BLE communication range of the target Bluetooth module 195), the interface controller 201 of the controller Bluetooth-enabled device 170 transitions to the range detection state 320 as indicated by arrow 315. When the interface controller 201 is in the range detection state 320, the BLE interface 202 is in its active state, and the classical Bluetooth interface 204 is in its disabled state. Further, when the transition at 315 takes place, the interface controller 201 enables a Bluetooth proximity measurement module and begins measuring Bluetooth proximity to the target Bluetooth module 195 of the target Bluetooth-enabled device 190 (e.g., via a Bluetooth proximity profile).

As indicated by loop 322, when the interface controller 201 is in the range detection state 320, the interface controller 201 continuously determines proximity to the the BLE interface 202 of target Bluetooth module 195. The method used to perform Bluetooth proximity measurements can vary depending on the implementation, and can generally be any approach to determine the proximity between one Bluetooth module and another Bluetooth module. In some embodiments, this approach detection processing can be performed using techniques and technologies that are described in, for example, in U.S. patent application Ser. No. 13/728,882, filed Dec. 27, 2012, entitled "METHOD AND SYSTEM FOR DETECTING PROXIMITY OF AN END DEVICE TO A VEHICLE BASED ON SIGNAL STRENGTH INFORMATION RECEIVED OVER A BLUETOOTH LOW ENERGY (BLE) ADVERTISING CHANNEL," and assigned to the assignee of the present invention, which is incorporated herein by reference in its entirety. In one particular embodiment, the interface controller 201 can measure a parameter (such as RSSI or another signal strength indicator) and calculate, based on the measured parameter, proximity of the controller Bluetooth module 175 to the target Bluetooth module 195, and then compare calculated proximity to a calibratable threshold (CT) that can be varied or set by manufacturer depending on the implementation. If the calculated proximity is determined to be within the CT, the interface controller 201 can transition into the active state 330 (as indicated by arrow 325), enable its classical Bluetooth interface 204, and communicate a message to the interface controller 201 of the target Bluetooth module 195 to enable its classical Bluetooth interface 204. If the calculated proximity is determined not to be within the CT, the interface controller 201 can keep determining proximity to the target Bluetooth module 195. So, for example, when the interface controller 201 is in the range detection state 320 and the controller Bluetooth-enabled device 170 gets closer to the target Bluetooth-enabled device 190, the interface controller 201 can eventually determine that the proximity of the controller Bluetooth module 175 to the target Bluetooth module 195 is within the CT, which in turn causes the interface controller 201 to transition (at arrow 325) into the active state 330.

In other embodiments, proximity can be determined using techniques and technologies, such as a Bluetooth proximity profile, that are described in BLE standards.

When the interface controller 201 is in the active state 330, the BLE interface 202 is in its active state, and the classical Bluetooth interface 204 is in its enabled state. Further, when in the active state 330, the interface controller 201 continuously determines proximity to the target Bluetooth module 195 as indicated by loop 332 (using any of the techniques described above with respect to loop 322 of the range detection state 320), and also monitors to determine whether at least one trigger event (or action) has occurred to cause the interface controller 201 to transition from the active state 330 to the range detection state 320. In other words, the interface controller 201 remains in the active state 330 until at least one trigger event/action occurs to trigger the interface controller 201 to exit from the active state 330 and move back to the range detection state 320. When the interface controller 201 transitions from the active state 330 to the range detection state 320, the interface controller 201 disables the classical Bluetooth interface 204 of the controller Bluetooth module 175, and may optionally send a notification message to the interface controller 201 of the target Bluetooth-enabled device 190 indicating that the interface controller 201 of the target Bluetooth-enabled device 190 should disable its classical Bluetooth interface 204.

The trigger action or trigger event that causes the transition from the active state 330 can vary depending on the implementation. For example, in one embodiment the trigger event can be a change of state of the Bluetooth modules 175 or 195. In another embodiment, the trigger event can be a determination that the proximity of the controller Bluetooth module 175 to the target Bluetooth module 195 is determined to be above a near proximity threshold (NPT). The NPT can be the same as or different than the CT described above with respect to the range detection state 320. The NPT can vary depending on the implementation. In one non-limiting embodiment, where the controller Bluetooth-enabled device 170 is a smartphone (or any other consumer electronics device) and the target Bluetooth-enabled device 190 is in a vehicle, the NPT can be, for example, when smartphone 170 has entered the vehicle containing the target Bluetooth-enabled device 190. In another non-limiting embodiment, where the controller Bluetooth-enabled device 170 is a smartphone (or any other consumer electronics device) and the target Bluetooth-enabled device 190 is a headset, the NPT can be, for example, when smartphone 170 is within 2 meters of headset 190. In yet another non-limiting embodiment, where the controller Bluetooth-enabled device 170 is a camera (such as a webcam) and the target Bluetooth-enabled device 190 is a watch, the NPT can be, for example, when the watch 190 enters the viewable proximity (e.g., 10 meters) of the webcam 170.

For example, the controller Bluetooth-enabled device 170 may move away from the target Bluetooth-enabled device 190 (or vice versa) such that the proximity of the controller Bluetooth module 175 to the target Bluetooth module 195 exceeds the NPT, in which case the interface controller 201 transitions from the active state 330 to the range detection state 320 as indicated by arrow 335.

Alternatively, the controller Bluetooth-enabled device 170 can determine that a change of state has occurred, and if so, the interface controller 201 transitions from the active state 330 back to the range detection state 320 as indicated by arrow 335. For example, the controller Bluetooth module 175 can determine that there is no longer a connection to the target Bluetooth module 195 such as when the target Bluetooth module 195 of the target Bluetooth-enabled device 190 powers off, or when a specific Bluetooth Profile link between the controller Bluetooth module 175 and the target Bluetooth module 195 ends, or when the controller Bluetooth module 175 requests to end, is requested to end, or no longer receives, signals from the target Bluetooth module 195.

When the interface controller 201 transitions back to the range detection state 320, the interface controller 201 can continue to determine the proximity between the controller Bluetooth module 175 and the target Bluetooth module 195 (as indicated by loop 322 and as described above). Depending on the proximity between the controller Bluetooth module 175 and the target Bluetooth module 195, the interface controller 201 can transition to either the far-field state 310 (as indicated by arrow 327) or back to the active state 330 (as indicated by arrow 325). The conditions for the transition from the range detection state 320 to the active state 330 (as indicated by arrow 325) are already described above.

On the other hand, the interface controller 201 transitions from the range detection state 320 to the far-field state 310 (as indicated by arrow 327) when the interface controller 201 of the controller Bluetooth-enabled device 170 determines that it is unable to communicate with the target Bluetooth-enabled device 190 over a BLE connection via their respective BLE interfaces 202. This can happen, for example, when the controller Bluetooth module 175 is no longer within BLE communication range of the target Bluetooth module 195 (e.g., when the controller Bluetooth module 175 is no longer within BLE communication range of the target Bluetooth module 195).

When the interface controller 201 transition from the range detection state 320 to the far-field state 310, the interface controller 201 will place its BLE interface 202 in the idle state, disable its classical Bluetooth interface 204, and also disable its Bluetooth proximity measurement module to stop measuring Bluetooth proximity via BLE.

Example Implementations

As noted above, the Bluetooth-enabled device 170 and the Bluetooth-enabled device 190 can be any type of electronics devices that are Bluetooth-enabled.

In one non-limiting example implementation of the disclosed embodiments, the Bluetooth-enabled device 170 can be a consumer electronics device (e.g., smartphone) that is pre-paired with a second Bluetooth module 195 implemented in a vehicle 110 (e.g., a Bluetooth module embedded within an on-board computer system of the vehicle 110, for instance, at an automotive head unit or infotainment system of the vehicle 110). As above, the first Bluetooth module 175 and the second Bluetooth module 195 both include a classical Bluetooth interface 204 and a Bluetooth low-energy interface 202.

When a user, who possesses the Bluetooth-enabled device 170, moves away from the vehicle 110, the interface controller 201 of first Bluetooth module 175 can detect that the first Bluetooth module 175 (that is implemented within the Bluetooth-enabled device 170) is no longer in proximity of the second Bluetooth module 195 (implemented in the vehicle 110), the interface controller 201 of first Bluetooth module 175 will automatically force the classical Bluetooth interface 204 of the consumer electronics device 170 to be disabled (e.g., switch off). For instance, in one implementation, the interface controller 201 of first Bluetooth module 175 can determine that the first Bluetooth module 175 is no longer in proximity of the second Bluetooth module 195, for example, when a Bluetooth connection (e.g., a BLE connection) between the first Bluetooth module 175 and the second Bluetooth module 195 terminates and the first Bluetooth module 175 is no longer connected to the second Bluetooth module 195.

Thus, based on the proximity of the first Bluetooth module 175 to the second Bluetooth module 195 of the vehicle 110, the interface controller 201 of first Bluetooth module 175 can determine whether or not to switch the classical Bluetooth interface 204 on or off. This way the state of the classical Bluetooth interface 204 of the first Bluetooth module 175 can be controlled (e.g., disabled) to reduce and/or minimize the power on duty cycle. This helps conserve battery resources of the Bluetooth-enabled device 170 (e.g., reduces battery drain in the Bluetooth-enabled device 170).

By contrast, when the Bluetooth-enabled device 170 comes within a certain proximity of the vehicle 110 and is within Bluetooth communication range of the second Bluetooth module 195, the interface controller 201 of first Bluetooth module 175 will automatically force the classical Bluetooth interface 204 of the consumer electronics device 170 to be enabled (e.g., switch on).

In addition, when a user switches off their vehicle and the second Bluetooth module 195 powers down, the interface controller 201 of the second Bluetooth module 195 can communicate a notification message to the interface controller 201 of the Bluetooth-enabled device 170 to notify it of the pending state change. In response, the interface controller 201 of the Bluetooth-enabled device 170 can disable the classical Bluetooth interface 204 to reduce battery drain.

In another non-limiting implementation of the disclosed embodiments, the Bluetooth-enabled device 170 can be a consumer electronics device (e.g., smartphone) the Bluetooth-enabled device 190 can be a Bluetooth-enabled headset 190.

While at least one exemplary embodiment has been presented in the foregoing detailed description, it should be appreciated that a vast number of variations exist. For example, while the description above describes automatic control of a Bluetooth interface of a Bluetooth module, similar techniques could also be applied to automatically control the operating state of a WLAN interface of a WLAN module based on proximity to another WLAN interface of another WLAN module. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A first Bluetooth-enabled device, comprising:
a first Bluetooth module comprising:
a classical Bluetooth interface designed to operate in a first set of operating states comprising an enabled state and a disabled state;
a Bluetooth Low Energy (BLE) interface designed to operate in a second set of operating states comprising an idle state or an active state; and
an interface controller in operable communication with the classical Bluetooth interface and the BLE interface, wherein the interface controller is designed to control, based on proximity between the first Bluetooth module and a second Bluetooth module of a second Bluetooth-enabled device, the first set of operating states of the classical Bluetooth interface and the second set of operating states of the BLE interface.

2. A first Bluetooth-enabled device according to claim 1, wherein the interface controller is designed to operate in a far-field state, a range detection state and an active state.

3. A first Bluetooth-enabled device according to claim 1, wherein the interface controller is further designed to:
switch the BLE interface from the idle state to the active state when the interface controller transitions from the far-field state to the range detection state.

4. A first Bluetooth-enabled device according to claim 3, wherein the interface controller is further designed to:
scan for a BLE beacon transmitted from the BLE interface of the second Bluetooth module; and
transition from the far-field state to the range detection state when the BLE beacon is detected.

5. A first Bluetooth-enabled device according to claim 1, wherein the interface controller is further designed to:
switch the classical Bluetooth interface from the disabled state to the enabled state when the interface controller transitions from the range detection state to the active state.

6. A first Bluetooth-enabled device according to claim 5, wherein the interface controller is further designed to:
determine the proximity between the BLE interface of the first Bluetooth module and the BLE interface of the second Bluetooth module; and
transition from the range detection state to the active state when the proximity between the BLE interface of the first Bluetooth module and the BLE interface of the second Bluetooth module is determined to be within a calibration threshold.

7. A first Bluetooth-enabled device according to claim 2, wherein the interface controller is further designed to:
switch the classical Bluetooth interface from the enabled state to the disabled state when the interface controller transitions from the active state to the range detection state.

8. A first Bluetooth-enabled device according to claim 7, wherein the interface controller is further designed to:
determine whether a trigger event has occurred; and
transition from the active state to the range detection state when the trigger event occurs.

9. A first Bluetooth-enabled device according to claim 8, wherein the interface controller is further designed to:
determine the proximity between the BLE interface of the first Bluetooth module and the BLE interface of the second Bluetooth module; and
wherein the interface controller determines that the trigger event has occurred when the interface controller determines that the proximity between the BLE interface of the first Bluetooth module and the BLE interface of the second Bluetooth module is determined to be within a near proximity threshold.

10. A first Bluetooth-enabled device according to claim 8, wherein the interface controller is further designed to:
determine whether there is a connection between the BLE interface of the first Bluetooth module and the BLE interface of the second Bluetooth module; and
wherein the interface controller determines that the trigger event has occurred when the interface controller determines that there is no connection between the BLE interface of the first Bluetooth module and the BLE interface of the second Bluetooth module.

11. A first Bluetooth-enabled device according to claim 2, wherein the interface controller is further designed to:
switch the BLE interface from the active state to the idle state when the interface controller transitions from the range detection state to the far-field state.

12. A first Bluetooth-enabled device according to claim 11, wherein the interface controller is further designed to:
determine whether the BLE interface of the first Bluetooth module is receiving communications from the BLE interface of the second Bluetooth module; and
transition from the range detection state to the far-field state when the BLE interface of the first Bluetooth module is not receiving communications from the BLE interface of the second Bluetooth module.

13. A method performed at an interface controller for a first Bluetooth module of a first Bluetooth-enabled device, the method comprising:
determining, at the interface controller, proximity between the first Bluetooth module and a second Bluetooth module of a second Bluetooth-enabled device; and
controlling, at the interface controller, based on the proximity between the first Bluetooth module and the second Bluetooth module: transitions between a first set of operating states of a classical Bluetooth interface of the first Bluetooth module, wherein the first set of operating states comprise an enabled state and a disabled state; and transitions between a second set of operating states of a Bluetooth Low Energy (BLE) interface of the first Bluetooth module, wherein the second set of operating states comprise an idle state or an active state.

14. A method according to claim 13, wherein the interface controller is designed to operate in a far-field state, a range detection state and an active state.

15. A method according to claim 14, wherein controlling, at the interface controller, further comprises:
scanning for a BLE beacon transmitted from a BLE interface of the second Bluetooth module;
transitioning, at the interface controller, from the far-field state to the range detection state when the BLE beacon is detected; and
switching the BLE interface from the idle state to the active state when the interface controller transitions from the far-field state to the range detection state.

16. A method according to claim 14, wherein controlling, at the interface controller, further comprises:

determining, at the interface controller, the proximity between the BLE interface of the first Bluetooth module and the BLE interface of the second Bluetooth module;

transitioning, at the interface controller, from the range detection state to the active state when the proximity between the BLE interface of the first Bluetooth module and the BLE interface of the second Bluetooth module is determined to be within a calibration threshold; and switching the classical Bluetooth interface from the disabled state to the enabled state when the interface controller transitions from the range detection state to the active state.

17. A method according to claim 14, wherein controlling, at the interface controller, further comprises:

determining, at the interface controller, whether a trigger event has occurred;

transitioning, at the interface controller, from the active state to the range detection state when the trigger event occurs; and switch the classical Bluetooth interface from the enabled state to the disabled state when the interface controller transitions from the active state to the range detection state.

18. A method according to claim 17, wherein controlling, at the interface controller, further comprises:

determining, at the interface controller, the proximity between the BLE interface of the first Bluetooth module and the BLE interface of the second Bluetooth module; and wherein the interface controller determines that the trigger event has occurred when the interface controller determines that the proximity between the BLE interface of the first Bluetooth module and the BLE interface of the second Bluetooth module is determined to be within a near proximity threshold.

19. A method according to claim 17, wherein controlling, at the interface controller, further comprises:

determining, at the interface controller, whether there is a connection between the BLE interface of the first Bluetooth module and the BLE interface of the second Bluetooth module; and wherein the interface controller determines that the trigger event has occurred when the interface controller determines that there is no connection between the BLE interface of the first Bluetooth module and the BLE interface of the second Bluetooth module.

20. A method according to claim 14, wherein controlling, at the interface controller, further comprises:

determining, at the interface controller, whether the BLE interface of the first Bluetooth module is receiving communications from a BLE interface of the second Bluetooth module;

transitioning, at the interface controller, from the range detection state to the far-field state when the BLE interface of the first Bluetooth module is not receiving communications from the BLE interface of the second Bluetooth module; and switching the BLE interface from the active state to the idle state when the interface controller transitions from the range detection state to the far-field state.

* * * * *